Patented Oct. 16, 1934

1,977,560

UNITED STATES PATENT OFFICE 1,977,560

PREPARATION OF MAGNESIUM SULPHATE

Otto V. Martin, Tulsa, Okla., assignor to Texaco Salt Products Company, New York, N. Y., a corporation of Delaware No Drawing. Application March 19, 1932,
Serial No. 600,057

4 Claims. (Cl. 23—128)

This invention relates to the preparation of magnesium sulphate from brines or solutions in which magnesium is present, and more particularly to the preparation of the sulphate in the form of Epsom salts from oil field brines and the like.

The invention contemplates the preparation of Epsom salts from naturally-occurring brines by a process wherein the raw brine is chemically treated to precipitate therefrom a sludge composed largely of magnesium hydroxide and which may include small amounts of other compounds, chiefly those of sodium, calcium, and iron. Water-soluble impurities may be removed from the sludge, following which it is admixed with water or dilute Epsom salt solution to form a suspension or slurry which is reacted with sulphuric acid to convert the material to the sulphate form. The resulting magnesium sulphate solution may be subjected either to settling or to filtration for the removal of insoluble matter, such as calcium sulphate. The substantially pure solution of magnesium sulphate is then concentrated advantageously by circulation through a heat absorption and spray evaporating system to form a concentrated solution from which the magnesium sulphate is precipitated in the form of Epsom salts.

The raw material suitable for use in my process may be any natural or artificially-prepared bittern or brine in which magnesium is present, usually in the form of dissolved salts. Among the principal brines that may be mentioned are oil field and salt well brines. Sea water may also provide a possible source of magnesium chloride which may be treated according to my method for the production of Epsom salts.

As my process has been devised particularly for the preparation of magnesium sulphate from oil field brines, it will be described in that connection, although it will be understood that other sources of magnesium salts may be employed and the desired sulphate prepared therefrom by a similar process.

The usual oil field brine, in addition to containing magnesium chloride, in general also contains substantial quantities of sodium chloride and calcium chloride as well as relatively smaller quantities of certain other substances, such as compounds of iron, aluminum, etc.

According to my process, the raw brine is treated with an alkaline material such as milk of lime solution formed by suspending slaked lime in water or in a brine solution. The brine and milk of lime suspension is subjected to mixing and then allowed to stand, whereupon magnesium is precipitated as magnesium hydroxide. The resulting sludge of magnesium hydroxide may contain small amounts of other impurities including compounds of sodium, calcium and iron.

The brine solution is decanted off and subjected to further treating, as may be desired, for the recovery therefrom of sodium chloride and calcium chloride.

The magnesium hydroxide sludge, composed, for example, of about 8% solids, is next subjected to washing and filtration. This operation may be advantageously carried out in a rotating drum type of continuous filter wherein the solids are deposited on the rotating filtering surface in the form of a filter cake and the liquid is drawn through the filtering surface and removed from the filter. The resulting filter cake is subjected to washing, in situ, by applying water thereto in the form of a spray. The water, during passage through the cake, dissolves the soluble impurities, particularly the sodium and calcium chlorides.

The washed filter cake is removed from the filter and may comprise about 30% by weight of solids composed substantially entirely of magnesium hydroxide with small amounts of calcium, iron and aluminum compounds.

This material is admixed with additional quantities of fresh water, or advantageously with dilute magnesium sulphate solution, thus forming a pumpable slurry or suspension of solids in liquid. The resulting slurry or suspension is then treated with sulphuric acid, preferably strong acid such as 98% sulphuric acid.

In effecting the reaction between the acid and the slurry, it is advantageous to employ a circulatory system wherein the slurry is circulated from a tank or other vessel through mixing means such as an orifice mixer or a coil adapted to provide a tortuous path of flow, and back again to the tank. The acid is continuously added to the slurry in suitable proportion before passage through the mixing coil wherein reaction with the slurry is substantially completed before the mixture returns to the main body in the tank. In this way, violent reaction between acid and slurry is avoided and, at the same time, a large part of the heat of reaction may be dissipated in the circulating lines. If desired, cooling means may be interposed between the mixing coil and the tank.

Circulation with continual slow mixing in of acid in this way is continued to effect conversion of the magnesium hydroxide to form magnesium sulphate in solution. Additional quantities of the filter cake may then be commingled directly with this solution, without first suspending the cake in water to form additional slurry. The circulation with acid is continued in order to build up a concentrated sulphate solution with a minimum introduction of water to the system. The sulphate solution is maintained slightly on the alkaline side for the purpose of avoiding the conversion of impurities to soluble compounds as well as to prevent corrosion of the equipment.

This slightly alkaline solution is subsequently drawn off to storage tanks where it is allowed to stand for a period of time to permit settling out of the insoluble impurities. If desired, the solution may be subjected to filtration instead of settling for the purpose of removing these impurities.

The resulting substantially pure magnesium sulphate solution is then subjected to concentration advantageously by circulation through a heat absorption and spray evaporation system, such as I have described in my copending application, Serial No. 475,270, filed August 14, 1930, now Patent No. 1,900,246. Briefly, this system comprises a heater which may be heated from a source of waste heat, or by means of steam or other suitable heating medium and a spray pond in communication therewith wherein the heated portion is exposed to the atmosphere in the form of a fine spray. Evaporation results from this spraying operation whereby the solution is concentrated to whatever degree necessary in order to bring about crystallization.

In concentrating magnesium sulphate solution, the solution may be heated to a temperature of from about 113° to 125° F., and then subjected to spraying in the above manner. The circulation of the solution through the heater and sprays may be continued during actual precipitation of crystals from the solution in which case the resulting crystals are usually in the form of so-called sugar crystals.

On the other hand, if it is desired to produce a salt in the form of needle crystals, it is of advantage to circulate the solution through the heater and spray system until a state of supersaturation is reached, and then discontinuing the spraying operation and permitting the sprayed solution to remain in a quiescent condition. Slow cooling, with not too great a temperature differential between the atmosphere and the sprayed solution, is apparently most productive of large needle crystals of the salt.

When crystallization is complete, the solution may be recirculated and further concentrated.

While the process has been described in connection with the preparation of Epsom salts, the invention is not necessarily restricted to the preparation of a single hydrate form of the salt. Other hydrates of magnesium may equally well be prepared, the particular hydrate desired being dependent upon the temperature at which the solution is maintained during precipitation or crystallization of the salt from the solution.

Obviously many modifications and variations of the invention, as hereinbefore set forth, may be made without departing from the spirit and scope thereof, and therefore only such limitations should be imposed as are indicated in the appended claims.

I claim:

1. In the preparation of Epsom salts from a magnesium hydroxide sludge, the method of converting the hydroxide to the sulphate in solution which comprises initially forming a pumpable suspension of a portion of the sludge, continuously circulating a stream of the suspension from a vessel through mixing means and back to the vessel, introducing sulphuric acid to the circulating stream continuously and in relatively small proportion to prevent excessively violent reaction therebetween, introducing additional relatively dry sludge to the solution in the vessel, and continuing the circulation in the presence of acid to form without evaporation a substantially saturated Epsom salt solution.

2. In the preparation of Epsom salts from magnesium hydroxide sludge, the method of converting the hydroxide to the sulphate in solution which comprises initially forming a pumpable suspension of a portion of the sludge, continuously circulating a stream of the suspension through a mixing zone, introducing sulphuric acid to the circulating stream continuously and in relatively small proportion to prevent excessively violent reaction therebetween, adding additional relatively dry sludge to the mixture, continuing the circulation in the presence of acid to form without evaporation a substantially saturated Epsom salt solution, and effecting supersaturation of the solution without subjecting it to boiling temperatures by exposing the saturated solution to the atmosphere in finely divided form whereby a supersaturated solution is produced at a temperature not in excess of about 125° F. and from which the salt is precipitated in the desired crystal form.

3. In the preparation of Epsom salts from magnesium hydroxide sludge, the method of converting the hydroxide to the sulphate in solution which comprises initially forming a pumpable suspension of a portion of the sludge, continuously circulating a stream of the suspension through a mixing zone, introducing sulphuric acid to the circulating stream continuously and in relatively small proportion to prevent excessively violent reaction therebetween, adding additional relatively dry sludge to the mixture, continuing the circulation in the presence of acid to form without evaporation a substantially saturated Epsom salt solution, separating insoluble impurities from the solution, and effecting supersaturation of the solution without subjecting it to boiling temperatures by exposing the saturated solution to the atmosphere in finely divided form whereby a supersaturated solution is produced at a temperature not in excess of about 125° F. and from which salt is precipitated in the desired crystal form.

4. In the preparation of Epsom salts from magnesium hydroxide sludge, the method of converting the hydroxide to the sulphate in solution which comprises forming a pumpable suspension of a portion of the sludge, circulating the suspension through a mixing zone, introducing sulphuric acid to the circulating stream in relatively small proportions to prevent excessively violent reaction therebetween, adding relatively dry sludge to the mixture, and continuing the circulation with addition of acid and dry sludge in suitable proportions to form without subsequent concentration a substantially saturated Epsom salt solution.

OTTO V. MARTIN.